US012134251B2

(12) United States Patent
Min et al.

(10) Patent No.: US 12,134,251 B2
(45) Date of Patent: Nov. 5, 2024

(54) FLAME-RETARDANT POLYESTER DECORATIVE SHEET

(71) Applicant: TORAY ADVANCED MATERIALS KOREA INC., Gumi-si (KR)

(72) Inventors: Ho Jin Min, Gumi-si (KR); Beom Taek Han, Gumi-si (KR); Nam Heui Lee, Gumi-si (KR); Myeong Seok Seong, Gumi-si (KR)

(73) Assignee: TORAY ADVANCED MATERIALS KOREA INC., Gumi-si (KR)

( * ) Notice: Subject to any disclaimer, the term of this patent is extended or adjusted under 35 U.S.C. 154(b) by 0 days.

(21) Appl. No.: 18/567,520

(22) PCT Filed: Jul. 15, 2022

(86) PCT No.: PCT/KR2022/010324
§ 371 (c)(1),
(2) Date: Dec. 6, 2023

(87) PCT Pub. No.: WO2023/013917
PCT Pub. Date: Feb. 9, 2023

(65) Prior Publication Data
US 2024/0269971 A1    Aug. 15, 2024

(30) Foreign Application Priority Data

Aug. 6, 2021 (KR) .................. 10-2021-0103603

(51) Int. Cl.
*B32B 27/00*        (2006.01)
*B32B 27/08*        (2006.01)
(Continued)

(52) U.S. Cl.
CPC .............. *B32B 27/08* (2013.01); *B32B 27/20* (2013.01); *B32B 27/36* (2013.01);
(Continued)

(58) Field of Classification Search
CPC ......... B32B 27/08; B32B 27/20; B32B 27/36; B32B 2250/03; B32B 2250/244;
(Continued)

(56) References Cited

U.S. PATENT DOCUMENTS

2014/0000751 A1    1/2014 Kagumba et al.
2020/0164624 A1*   5/2020 Wismans .............. B32B 27/065
(Continued)

FOREIGN PATENT DOCUMENTS

JP    05-140432 A    6/1993
JP    06-079846 A    2/1994
(Continued)

OTHER PUBLICATIONS

Office Action issued on Apr. 28, 2023 in counterpart Korean Patent Application No. 10-2021-0103603.

*Primary Examiner* — Betelhem Shewareged
(74) *Attorney, Agent, or Firm* — NSIP Law

(57) ABSTRACT

A flame-retardant polyester decorative sheet according to one embodiment of the present invention comprises: a core layer comprising a polyester resin and a polyphosphonate; and a skin layer, which is positioned on at least one surface of the core layer and contains a polyester resin and a polyphosphonate, wherein the content of a color master batch in the skin layer is greater than that in the core layer, thereby solving a discoloration problem caused by a fire retardant agent while satisfying Flame Retardant Performance Standards of Notification No. 2019-2 of the National Fire Agency, and thus a flame-retardant polyester decorative sheet, which has a color tone deviation equal to that of a conventional decorative sheet product using no fire retardant agent, can be provided.

6 Claims, 1 Drawing Sheet

(51) Int. Cl.
 *B32B 27/20* (2006.01)
 *B32B 27/36* (2006.01)
(52) U.S. Cl.
 CPC ..... *B32B 2250/03* (2013.01); *B32B 2250/244* (2013.01); *B32B 2250/40* (2013.01); *B32B 2255/10* (2013.01); *B32B 2255/26* (2013.01); *B32B 2264/1022* (2020.08); *B32B 2270/00* (2013.01); *B32B 2307/3065* (2013.01); *B32B 2307/4026* (2013.01); *B32B 2307/54* (2013.01); *B32B 2307/7376* (2023.05); *B32B 2451/00* (2013.01)
(58) Field of Classification Search
 CPC ............ B32B 2250/40; B32B 2255/10; B32B 2255/26; B32B 2264/1022; B32B 2270/00; B32B 2307/3065; B32B 2307/4026; B32B 2307/54; B32B 2307/7376; B32B 2451/00

USPC ...................................................... 428/195.1
See application file for complete search history.

(56) References Cited

U.S. PATENT DOCUMENTS

2021/0061993 A1    3/2021  Jeong et al.
2021/0261770 A1*   8/2021  Elkovitch .................. C08J 5/10

FOREIGN PATENT DOCUMENTS

| JP | 2015-054523 A | 3/2015 | |
| JP | 2017-509517 A | 4/2017 | |
| KR | 10-2015-0036294 A | 4/2015 | |
| KR | 10-2020-0060281 A | 5/2020 | |
| KR | 10-2021-0026559 A | 3/2021 | |
| WO | WO-2019231984 A1 * | 12/2019 | ............ B32B 15/14 |

* cited by examiner

FLAME-RETARDANT POLYESTER DECORATIVE SHEET

CROSS REFERENCE TO RELATED APPLICATIONS

This application is a U.S. National Stage Application of International Application No. PCT/KR2022/010324, filed on Jul. 15, 2022, which claims the benefit under 35 USC 119(a) and 365(b) of Korean Patent Application No. 10-2021-0103603, filed on Aug. 6, 2021, in the Korean Intellectual Property Office, the entire disclosure of which is incorporated herein by reference for all purposes.

TECHNICAL FIELD

The present invention relates to a synthetic resin film with excellent flame retardant performance, and more specifically, to a flame-retardant polyester decorative sheet having a multi-layer structure of polyester with excellent flame retardant performance and fire retardant properties, which is used for construction interior/exterior materials, flooring materials, and other decorative purposes.

BACKGROUND ART

Generally, a decorative sheet (deco sheet) is a sheet with various colors and patterns that is attached to the surfaces of various office and residential furniture, such as wardrobes or desks, as well as architectural materials and interior surfaces, providing various visual and tactile effects to the user.

The decorative sheet is manufactured in sheet form using plastic resins such as polyvinyl chloride resin or polypropylene resin, and various colors and patterns are applied during the manufacturing process. As the use of decorative sheets with specific colors and patterns continues to expand, decorative sheets that provide various visual effects on the surfaces of the decorative sheet through additional materials are used, in addition to offering simple colors and patterns. Such decorative sheets are widely used in indoor spaces as interior accessories.

In addition, polyester films widely used as decorative sheets do not have toxicity, unlike polyvinyl chloride, and they have excellent appearance quality, meeting environmental requirements. However, polyester films have a flammable property, making them susceptible to fire, which is a disadvantage. Particularly, due to the occurrence of large-scale fire incidents resulting in loss of life and property damage, flame retardant properties (fire retardant properties) are required for interior/exterior building materials, and as a result, flame retardant properties are also required for decorative sheets, which limit the use of polyester for decorative sheets.

To address the flame retardant property issue of the decorative sheets, flame retardant performance is achieved using decorative sheets and interior films made from polyvinyl chloride (PVC) resin, which has relatively good flame retardant performance. However, even though the plasticized polyvinyl chloride material conventionally used for decorative sheets has excellent physical properties and moldability and particularly fire retardant properties, it uses a film in which plasticizers are added to the vinyl chloride resin to give plasticity, thereby generating harmful gases like dioxins when incinerated. Hence, hazardous issues are consistently raised.

Thus, as the demand for polyester decorative sheets with flame retardant properties is increasing due to the environmental requirements aimed at resolving the toxicity issues of polyvinyl chloride decorative sheets, the development of flame-retardant polyester decorative sheets is required.

DETAILED DESCRIPTION OF THE INVENTION

Technical Problem

The present invention is devised to solve the aforementioned problems, and an object of the present invention is to provide a flame-retardant polyester decorative sheet, imparting flame retardancy to the polyester decorative sheet as a polyester resin-based decorative sheet, particularly meeting the Flame Retardant Performance Standards of Notification No. 2019-2 of the National Fire Agency, while also addressing the issue of discoloration caused by a fire retardant agent even when flame retardancy is provided, resulting in a flame-retardant polyester decorative sheet with low color-tone deviation.

The above and other objects and advantages of the present invention will become apparent from the following description of preferred embodiments.

Technical Solution

The above object is achieved by a flame-retardant polyester decorative sheet comprising a core layer containing a polyester resin and a polyphosphonate, and a skin layer, which is positioned on at least one surface of the core layer and contains a polyester resin and a polyphosphonate.

Preferably, the flame-retardant polyester decorative sheet may further comprise a protective coating layer containing a phosphorus-based fire retardant agent located on a surface of the skin layer.

Preferably, the flame-retardant polyester decorative sheet may have a phosphorus (P) content of 4,000 to 15,000 ppm.

Preferably, a difference (dE*) in color difference value of the flame-retardant polyester decorative sheet may be 0.5 or less compared to a decorative sheet with no polyphosphonate added.

Preferably, the core layer and the skin layer may have a polyphosphonate content that satisfies Equation 1.

$$2.56 \leq \text{Total decorative sheet thickness (mm)} \times \text{polyphosphonate content } (wt.\%) \leq 2.58 \quad \text{(Equation 1)}$$

Preferably, a tensile strength ratio of the flame-retardant polyester decorative sheet according to Equation 2 may be 0.7 to 1.

$$\text{Tensile strength ratio} = \frac{\text{Tensile strength of flame-retardant polyester decorative sheet}}{\text{Tensile strength of decorative sheet with no polyphosphonate added}} \quad \text{(Equation 2)}$$

Preferably, the core layer and the skin layer may each further include a color master batch formed by mixing 10 to 50 parts by weight of color dye or pigment with 100 parts by weight of polyester resin.

Preferably, the skin layer may contain a greater content of the color master batch than that of the core layer.

Preferably, the core layer may contain 4 to 12 wt. % of the color master batch based on the total weight of the core layer, and the skin layer may contain 25 to 35 wt. % of the color master batch based on the total weight of the skin layer.

Preferably, a thickness of the flame-retardant polyester decorative sheet may be 0.20 to 0.60 mm.

Advantageous Effects

According to an embodiment of the present invention, a flame-retardant polyester decorative sheet features a multi-layer structure, with each layer of the polyester decorative sheet incorporating a polyphosphonate fire retardant agent and applying a hard coating liquid containing a phosphorus-based fire retardant agent, followed by drying and curing through UV irradiation to form a protective coating layer, thereby providing a polyester decorative sheet with flame-retardant performance, which particularly satisfies the Flame Retardant Performance Standards of Notification No. 2019-2 of the National Fire Agency.

Additionally, according to an embodiment of the present invention, the flame-retardant polyester decorative sheet may address discoloration issues caused by a fire retardant agent while satisfying flame retardant properties, resulting in a flame-retardant polyester decorative sheet with color tone deviation equivalent to traditional decorative sheet products using no fire retardant agent.

However, the effects of the present invention are not limited to the effects mentioned above, and other effects not mentioned will be clearly understood by those skilled in the art from the description below.

MODE FOR INVENTION

Figure 1:
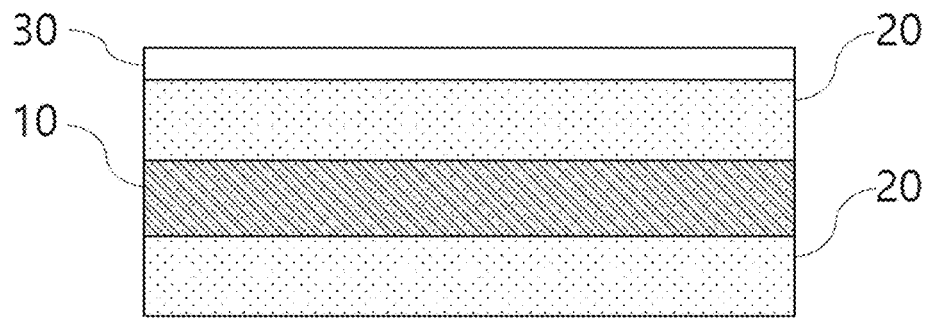
FIG. 1 is a schematic cross-sectional view of a flame-retardant polyester decorative sheet according to an embodiment of the present invention.

Hereinafter, embodiments of the present invention will be described in detail with reference to the accompanying drawings so as to be easily practiced by a person of ordinary skill in the art. It should be, however, understood that the present invention is not to be construed as limited to the embodiments set forth herein and may be embodied in many different forms.

In the drawings, the thickness of layers and regions are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Unless otherwise defined, all technical and scientific terms used herein have the same meaning as commonly understood by one of ordinary skill in the art to which this invention belongs. In case of conflict, the present specification, including definitions, will control. Although methods and materials similar or equivalent to those described herein can be used in the practice or testing of the invention, suitable methods and materials are described herein.

FIG. 1 is a schematic cross-sectional view of a flame-retardant polyester decorative sheet according to an embodiment of the present invention.

Referring to FIG. 1, a flame-retardant polyester decorative sheet according to an embodiment of the present invention may include a core layer 10 including a polyester resin and a polyphosphonate, and a skin layer 20 located on at least one surface of the core layer 10 and including a polyester resin and a polyphosphonate, and may further include a protective coating layer 30 applied and formed on a surface of the skin layer 20 and containing a phosphorus-based fire retardant agent.

The flame-retardant polyester decorative sheet according to an embodiment of the present invention may have a laminated structure in the form of skin layer/core layer in which the skin layer 20 is laminated on one side of the core layer 10, and it may have a laminated structure in the form of skin layer/core layer/skin layer in which the skin layer 20 is laminated on both sides of the core layer 10.

The core layer 10 is located at the center of the flame-retardant polyester decorative sheet and is composed of a polyester resin mixed with a fire retardant agent, polyphosphonate. The skin layer 20 is located outside the core layer 10 and, similar to the core layer 10, is composed of a polyester resin mixed with a fire retardant agent, polyphosphonate.

In this case, the polyester resin constituting the core layer 10 and skin layer 20 may use copolymerized polyester resin, and, if necessary, recycled materials may be added to reduce costs.

Dicarboxylic acid that forms copolymerized polyester resin is preferably at least one selected from the group consisting of isophthalic acid, 2,6-naphthalenedicarboxylic acid, sebacic acid, adipic acid, diphenyldicarboxylic acid, 5-tert-butyl isophthalic acid, 2,2,6,6-tetramethyl-4,4'-diphenyl dicarboxylic acid, 1,1,3-trimethyl-3-phenylindane-4,5-dicarboxylic acid, 5-sodium sulfoisophthalic acid, trimellitic acid, oxalic acid, malonic acid, succinic acid, glutaric acid, pimelic acid, azelaic acid, pyromellitic acid, 1,4-cyclohexane dicarboxylic acid, 1,3-cyclohexane dicarboxylic acid, and dimethyl-1,4-cyclohexanedicarboxylic acid.

In addition, the diol components that form the copolymerized polyester resin is preferably at least one selected from the group consisting of diethylene glycol, triethylene glycol, hexanediol, petanediol, diols of 2,2-(4-oxyphenol) propane derivatives, xylene glycol, 1,4-butanediol, 1,3-butanediol, 1,2-butanediol, 1,3-propanediol, 1,2-propanediol, 1,4-cyclohexanedimethanol, 1,3-cyclohexanedimethanol, 2,2-bis-(4-hydroxyphenol)propane, bis(4-hydroxyphenyl) sulfone, polytetramethylene glycol, polyethylene glycol, 2-methyl-1,3-propanediol, and 2,2-dimethyl-1,3-propanediol.

Additionally, as one example, the polyester resin constituting the core layer 10 and the skin layer 20 may be composed of glycol-modified polyethylene terephthalate (PET-G) and polybutylene terephthalate (PBT).

Glycol modified polyethylene terephthalate (PET-G) resin included in glycol-modified polyethylene terephthalate (PET-G) is an amorphous resin formed by copolymerization of terephthalic acid (TPA), ethylene glycol (EG), and cyclohexanedimethanol (CHDM), which has excellent processability, moldability, and printability, no deformation due to shrinkage, excellent impact resistance, no chlorine gas when incinerated or in the event of a fire, and no harmful substances, such as environmental hormones, etc. Thus, it is suitable for use in the present invention used as a decorative sheet.

Polybutylene terephthalate (PBT) is a crystalline polymer, which has characteristics of improving solvent resistance and flexibility when forming a skin layer. Thus, when the protective coating layer 30 is coated on the skin layer 20, a coating liquid is prevented from permeating into the skin layer 20, the high solvent resistance prevents damage to the core layer 10 and the skin layer 120, and elongation is increased. In addition, as the PBT is mixed into the core layer 10 and the skin layer 20, a forming temperature is lowered, thereby increasing elongation and improving hazy phenomenon.

In the present invention, the thickness of the flame-retardant polyester decorative sheet with a skin layer/core layer/skin layer structure is preferably 0.20 to 0.60 mm. When the thickness is less than 0.20 mm, there are issues of color and strength deterioration with an increase in the flame retardant ratio, while exceeding 0.60 mm results in an additional cost increase due to the higher proportion of expensive sheets in furniture assembly.

In particular, the content of polyphosphonate in the core layer and in the skin layer varies depending on the product's thickness, and it preferably satisfies the following Equation 1:

$$2.56 \leq \text{Total decorative sheet thickness (mm)} \times \text{polyphosphonate content } (wt.\%) \leq 2.58 \quad \text{(Equation 1)}$$

For example, in the case of a product with a thickness of 0.60 mm, it is preferable for the core layer 10 to contain 4.3 wt. % of polyphosphonate based on the total weight of the core layer 10, and in the case of a product with a thickness of 0.20 mm, it is desirable to contain 12.8 wt. %.

In addition, for example, in the case of a product with a thickness of 0.60 mm, it is preferable for the skin layer 20 to contain 4.3 wt. % of polyphosphonate based on the total weight of the skin layer 20, and in the case of a product with a thickness of 0.20 mm, it is preferable to contain 12.8 wt. %.

In this case, when the value of Equation 1 exceeds 2.58 (indicating an excessive polyphosphonate content), tensile strength decreases, and when the value of Equation 1 is below 2.56 (indicating insufficient polyphosphonate content), flame retardant performance becomes inadequate.

The core layer 10 and the skin layer 20 preferably include a color master batch made of color dyes or pigments and polyester resin, and the skin layer 20 preferably contains a greater content of color master batch than that of the core layer 10. In this case, the color master batch is formed by mixing 10 to 50 parts by weight of color dye or pigment with 100 parts by weight of polyester.

More specifically, the core layer 10 preferably contains 4 to 12 wt. % of color master batch based on the total weight of the core layer 10 and the skin layer 20 preferably contains 25 to 35 wt. % of color master batch based on the total weight of the skin layer 20.

If the content of the color master batch in the core layer 10 is less than 4 wt. %, it results in insufficient product shielding properties, while exceeding 12 wt. % becomes a significant cost factor.

Moreover, if the content of the color master batch in the skin layer 20 is less than 25 wt. %, it causes color deviation due to the color of polyphosphonate, and if it exceeds 35 wt. %, attachment strength is reduced when attaching to wood due to a decrease in PET-G content in the skin layer.

The color dye or pigment included in the flame-retardant polyester decorative sheet according to an embodiment of the present invention is used to provide shielding properties and color to the decorative sheet. The polyester decorative sheet may include one or more dyes or pigments selected from the group consisting of white, black, red, yellow, green, blue, and purple.

Pigments usable in the present invention may be any inorganic pigment or organic pigment known to those skilled in the art without limitation, as long as they are decomposed and thus do not cause discoloration or appearance defects when producing the color master batch. As an example, typical white pigments may include inorganic particles such as titanium dioxide, calcium carbonate, barium sulfate, magnesium carbonate, kaolin, silica, clay, calcium tartrate, aluminum oxide, calcium phosphate, etc., and may be insoluble high-melting organic compound fine particles used when melt-mixed with a copolymerized polyester resin, cross-linked polymer fine particles, and internal particles formed inside polymer during the manufacture of copolymerized polyester using metal compound catalysts used in polyester synthesis, such as alkali metal compounds and alkali earth metal compounds. Additionally, carbon black is commonly used as a black pigment. Furthermore, pigments for red, yellow, green, blue, and purple, which are the primary colors of Munsell's color system, may be selectively used within the range of pigments known to those skilled in the art.

In one embodiment, the protective coating layer 30 is applied and formed on the surface of the skin layer 20 and contains a phosphorous-based fire retardant agent (e.g., ammonium polyphosphate) and UV-curable resin (e.g., aliphatic urethane acrylate). The protective coating layer 30 is formed by coating a hard coating liquid in which the phosphorous-based fire retardant agent is mixed with UV-curable resin onto the skin layer 20, followed by drying and then curing it by a UV curing method.

In one embodiment, a thickness ratio (core layer thickness/skin layer thickness) between the core layer 10 and the skin layer 20 is preferably 5 to 7. When the thickness ratio is less than 5, it leads to cost increase issues, and if it exceeds 7, it may be difficult to prevent discoloration of the core layer due to an insufficient skin layer.

The content of phosphorus (P) in the flame-retardant polyester decorative sheet according to an embodiment of the present invention is preferably 4,000 to 15,000 ppm. The appropriate content of phosphorus added varies with the thickness and is determined by the content of polyphosphonate. The phosphorus content of polyphosphonate is at an average level of 10.75%, and it is possible to adjust the appropriate phosphorus content of a flame-retardant decorative sheet according to the thickness by adjusting the input amount of polyphosphonate during the production of the flame-retardant decorative sheet. If the phosphorus content is less than 4,000 ppm, it leads to insufficient flame-retardant performance, and if it exceeds 15,000 ppm, it raises concerns related to cost, difficulty in sheet extrusion due to viscosity reduction, and potential damage during cutting processing due to reduced tensile strength.

A difference in color difference value (dE) between the flame-retardant polyester decorative sheet according to an embodiment of the present invention and a non-flame-retardant general decorative sheet of the same color is preferably 0.5 or less. If the difference in color difference value (dE) exceeds 0.5, it is considered as color discrepancy, causing difficulties in concurrent and alternative use.

Furthermore, a tensile strength ratio according to Equation 2 is preferably 0.7 to 1 when comparing the flame-retardant polyester decorative sheet in accordance with an embodiment of the present invention to a non-flame-retardant polyester decorative sheet of the same thickness. When the tensile strength ratio according to Equation 2 is greater than or equal to 0.7, excessive changes in properties, such as tensile strength differences and color difference specifications, occur due to the use of a fire retardant agent.

$$\text{Tensile strength ratio} = \frac{\text{(Tensile strength of flame-retardant polyester decorative sheet)}}{\text{(Tensile strength of decorative sheet with no polyphosphonate added)}} \quad \text{(Equation 2)}$$

Figure 2:
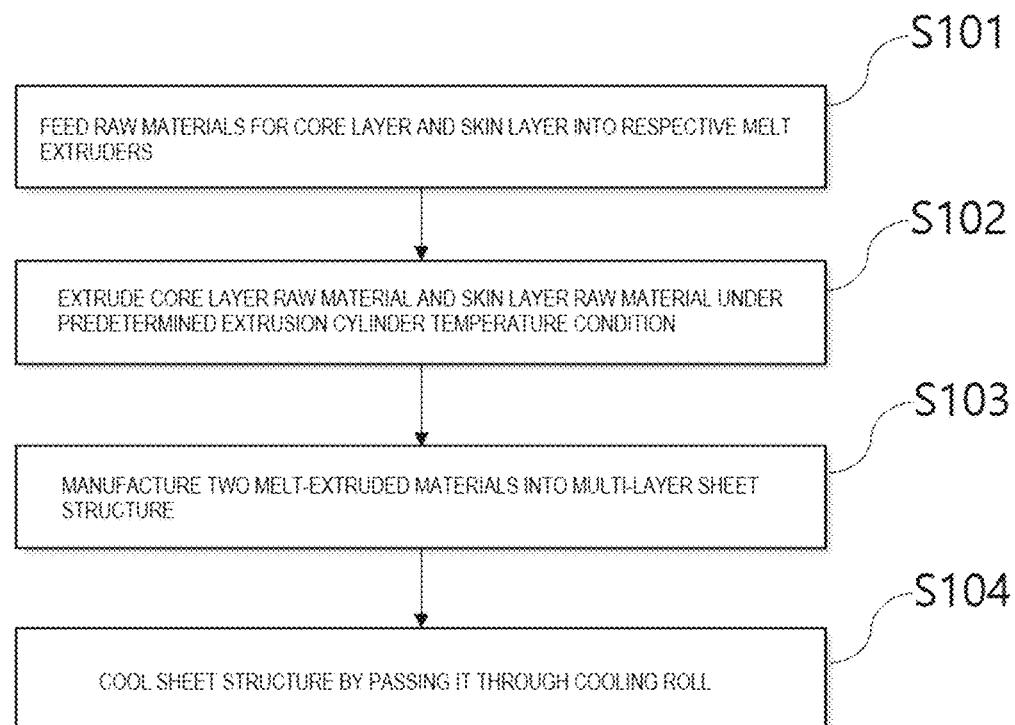
FIG. 2 is a flowchart illustrating a method of manufacturing a flame-retardant polyester decorative sheet according to an embodiment of the present invention.

FIG. 2 is a flowchart illustrating a method of manufacturing a flame-retardant polyester decorative sheet according to an embodiment of the present invention.

Referring to FIG. 2, a method for manufacturing a flame-retardant polyester decorative sheet according to an embodiment of the present invention may include a first step S101 of feeding raw materials for a core layer and a skin layer into respective melt extruders, a second step S102 of extruding each of the melt extruders under a predetermined extrusion cylinder temperature condition, a third step S103 of manufacturing two melt-extruded materials into a multi-layer sheet structure, a fourth step S104 of cooling the sheet structure by passing it through a cooling roll, and a fifth step of coating a hard coating liquid on a surface of the skin layer to form a protective coating layer.

In the first step S101 of feeding raw materials for the core layer and the skin layer into the respective melt extruders, raw materials formed by mixing polyester resin and polyphosphonate, which constitute the core layer and the skin layer, are fed into different melt extruders. In this case, the raw materials for the core layer and the skin layer may be prepared by adding different amounts of a color master batch in addition to the polyester resin and the polyphosphonate, or by mixing a master batch based on a polyester resin containing a color dye or pigment, polyphosphonate, and a polyester-based virgin material.

Next, in the second step S102 of extruding each of the melt extruders under predetermined extrusion cylinder temperature conditions, the raw materials for the core layer and the skin layer are extruded under predetermined temperature conditions.

Then, in the third step S103 of manufacturing two melt-extruded materials into a multi-layer sheet structure, both melt-extruded materials are manufactured into a multi-layer sheet structure in the form of a skin layer/core layer or skin layer/core layer/skin layer by passing through a feed block and a T-Die, or by extruding into different flow paths of a multilayer T-Die.

Finally, a flame-retardant polyester decorative sheet according to an embodiment of the present invention is manufactured by the fourth step S104 of cooling the sheet structure by passing through a cooling roll.

Hereinafter, the present invention will be described in more detail with reference to Examples. The following Examples are provided to illustrate further the present disclosure and are not intended to limit the scope of the present invention.

EXAMPLES

Example 1

A core layer raw material and a skin layer raw material, both including a color master batch composed of 50 parts by weight of $TiO_2$ pigment and 50 parts by weight of polyester resin, polyphosphonate as a fire retardant agent, and a polyester-based virgin material, were respectively fed into melt extruders for a core layer and a skin layer. The composition of the raw materials fed into the melt extruders for the core layer and the skin layer is as shown in Table 1.

Next, the core layer raw material and the skin layer raw material were extruded separately at an extrusion cylinder temperature of 270° C. The two melt-extruded materials were then passed through flow paths having a three-layered structure and T-die to form a sheet structure and cooled by passing through a cooling roll, thereby preparing a decorative sheet with a skin layer/core layer/skin layer structure with a thickness of 0.40 mm.

Subsequently, after coating and drying a hard coating liquid containing a phosphorus-based fire retardant agent (ammonium polyphosphate) and UV-curable resin (aliphatic urethane acrylate) on one surface of the prepared sheet, a protective coating layer was formed by drying and UV curing the same, thereby preparing a flame-retardant polyester decorative sheet.

Example 2

A flame-retardant polyester decorative sheet was prepared in the same manner as in Example 1, except that the protective coating layer was not formed.

Example 3

A flame-retardant polyester decorative sheet was prepared in the same manner as in Example 2, except that the thickness of the decorative sheet was set to 0.20 mm and the composition for the core layer and the skin layer was varied as shown in Table 1.

Example 4

A flame-retardant polyester decorative sheet was prepared in the same manner as in Example 2, except that the thickness of the decorative sheet was set to 0.60 mm and the composition for the core layer and the skin layer was varied as shown in Table 1.

TABLE 1

| Unit (wt. %) | | Example 1 | Example 2 | Example 3 | Example 4 |
|---|---|---|---|---|---|
| Total thickness | | 0.40 mm | 0.40 mm | 0.20 mm | 0.60 mm |
| Polyester-based virgin material | Core layer | 87.6 | 87.6 | 75.2 | 91.7 |
| | Skin layer | 63.6 | 63.6 | 52.2 | 70.7 |
| Polyphosphonate | Core layer | 6.4 | 6.4 | 12.8 | 4.3 |
| | Skin layer | 6.4 | 6.4 | 12.8 | 4.3 |
| Color master batch | Core layer | 6 | 6 | 12 | 4 |

TABLE 1-continued

| Unit (wt. %) | | Example 1 | Example 2 | Example 3 | Example 4 |
|---|---|---|---|---|---|
| | Skin layer | 30 | 30 | 35 | 25 |

COMPARATIVE EXAMPLES

Comparative Example 1

A flame-retardant polyester decorative sheet was prepared in the same manner as in Example 1, except that the composition for the core layer and the skin layer was varied as shown in Table 2.

Comparative Example 2

A flame-retardant polyester decorative sheet was prepared in the same manner as in Example 1, except that the composition for the core layer and the skin layer was varied as shown in Table 2.

Comparative Example 3

A flame-retardant polyester decorative sheet was prepared in the same manner as in Example 1, except that the composition for the core layer and the skin layer was varied as shown in Table 2.

Comparative Example 4

A flame-retardant polyester decorative sheet was prepared in the same manner as in Example 2, except that the compositions of the core layer and the skin layer were varied as shown in Table 2.

Comparative Example 5

A flame-retardant polyester decorative sheet was prepared in the same manner as in Example 2, except that the thickness of the decorative sheet and the compositions of the core layer and the skin layer were varied as shown in Table 2.

Comparative Example 6

A flame-retardant polyester decorative sheet was prepared in the same manner as in Example 2, except that the thickness of the decorative sheet and the compositions of the core layer and the skin layer were varied as shown in Table 2.

Comparative Example 7

A flame-retardant polyester decorative sheet was prepared in the same manner as in Example 2, except that the thickness of the decorative sheet and the compositions of the core layer and the skin layer were varied as shown in Table 2.

Comparative Example 8

A flame-retardant polyester decorative sheet was prepared in the same manner as in Example 2, except that the thickness of the decorative sheet and the compositions of the core layer and the skin layer were varied as shown in Table 2.

TABLE 2

| Unit (wt. %) | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Total thickness | | 0.40 mm | 0.40 mm | 0.40 mm | 0.40 mm | 0.20 mm | 0.60 mm | 0.20 mm | 0.60 mm |
| Polyester-based virgin material | Core layer | 88.5 | 87.6 | 94 | 82.1 | 75 | 92 | 74.2 | 92.7 |
| | Skin layer | 88.5 | 70 | 63.6 | 82.1 | 52 | 71 | 51.2 | 71.7 |
| Polyphosphonate | Core layer | X | 6.4 | — | 6.4 | 13 | 4 | 12.8 | 4.3 |
| | Skin layer | X | — | 6.4 | 6.4 | 13 | 4 | 12.8 | 4.3 |
| Color master batch | Core layer | 11.5 | 6 | 6 | 11.5 | 12 | 4 | 13 | 3 |
| | Skin layer | 11.5 | 30 | 30 | 11.5 | 35 | 25 | 36 | 24 |

Physical properties were measured through the following experimental examples using the decorative sheets prepared in Examples 1 to 4 and Comparative Examples 1 to 8, and the results are shown in Tables 3 and 4 below.

EXPERIMENTAL EXAMPLES (1) 45 Degree Combustion Test

To confirm compliance with the Flame Retardant Performance Standards of Notification No. 2019-2 of the National Fire Agency, measurements were taken for after-flame time, after-glow time, carbonization area, carbonization length, and the number of times of contact with flame. These measurements were conducted following the flame retardant performance test guidelines of the Korea Fire Industry Technology Institute (KFI) and were based on the 45-degree combustion test (slope method). In this case, three repeated tests were conducted on the same sample, and measurements were taken for each of them.

(2) Measurement of Color Difference

Color values (L, a, b) and color difference (dE) were measured using D65 light source and a CM-2500d (Minolta Co., Ltd.) in accordance with ASTM E1164 standards.

Additionally, a difference (dE*) in color difference value from Target DATA without the use of polyphosphonate (Comparative Example 1) was calculated.

(3) Measurement of Transmittance

Total transmittance was measured using COH-400 (NIPPON DENSHOKU INDUSTRIES Co., LTD.) on the upper surface of the skin layer.

(4) Measurement of Phosphorus Content

The phosphorus content of the prepared decorative sheet was measured using NMR measurement.

(5) Tensile Strength

Tensile strength was measured in accordance with ISO 527 standards.

TABLE 3

| Test item | | Test reference | Example 1 | | | Comparative Example 1 | | | Comparative Example 2 | | | Comparative Example 3 | | |
|---|---|---|---|---|---|---|---|---|---|---|---|---|---|---|
| | | | 1 | 2 | 3 | 1 | 2 | 3 | 1 | 2 | 3 | 1 | 2 | 3 |
| 45 degree combustion test | After flame time | Within 5 sec. | 3.6 | 4.8 | 1.1 | 175.3 | Completely burned | 80.1 | 29.1 | 26.7 | 29.3 | 31.4 | 36.5 | 23.3 |
| | After glow time | Within 20 sec. | 0 | 0 | 0 | 0 | | 0 | 0 | 0 | 0 | 0 | 0 | 0 |
| | Carbonization area | Within 40 cm$^2$ | 8.9 | 14.5 | 8.1 | 157.2 | | 14.9 | 14.3 | 10.4 | 12.6 | 25.7 | 32.3 | 24.3 |
| | Carbonization length | Within 20 cm$^2$ | 4 | 4.5 | 3.8 | 14.6 | | 6.3 | 6 | 5.3 | 6.6 | 8.6 | 9.4 | 8.2 |
| | Number of times of contact with flame | 3 times or more | | NA | | | NA | | | NA | | | NA | | |

In Example 1 according to an embodiment of the present invention, it can be seen that it satisfies the Flame Retardant Performance Standards of Notification No. 2019-2 of the National Fire Agency by comparing it with Comparative Example 1, which does not use polyphosphonate, Comparative Example 2, which uses polyphosphonate only in the core layer, and Comparative Example 3, which uses polyphosphonate only in the skin layer, and shows superior results in after flame time, after glow time, carbonization area, and carbonization length. In contrast, Comparative Examples 1 to 3 do not meet the Flame Retardant Performance Standards of Notification No. 2019-2 of the National Fire Agency. Thus, the flame-retardant polyester decorative sheet according to Example 1 of the present invention can meet the Flame Retardant Performance Standards of Notification No. 2019-2 of the National Fire Agency by including a predetermined amount of polyphosphonate in both the skin layer and the core layer.

TABLE 4

| | L* | a* | b* | dE* (Difference in color difference value) | Transmittance (%) | Phosphorus content (ppm) | Tensile strength (Kgf/mm$^2$) |
|---|---|---|---|---|---|---|---|
| Target data (Comparative Example 1) | 95.59 | −0.85 | 2.35 | — | 3.22% | 0 | 3.98 |
| Example 2 | 95.55 | −0.76 | 2.18 | 0.20 | 3.30% | 6,880 | 3.24 |
| Example 3 | 95.42 | −0.70 | 2.29 | 0.23 | 3.48% | 13,760 | 2.91 |
| Example 4 | 95.51 | −0.81 | 2.15 | 0.22 | 3.18% | 4,623 | 3.68 |
| Comparative Example 4 | 95.22 | −0.95 | 3.59 | 1.37 | 3.23% | 6,880 | 3.30 |
| Comparative Example 5 | 95.30 | −0.65 | 2.48 | 0.38 | 3.36% | 16,125 | 2.58 |
| Comparative Example 6 | 95.58 | −0.84 | 2.10 | 0.25 | 3.20% | 3,225 | 3.80 |
| Comparative Example 7 | 95.50 | −0.77 | 2.20 | 0.20 | 2.80% | 13,760 | 2.71 |
| Comparative Example 8 | 95.38 | −0.91 | 2.91 | 0.60 | 4.05% | 4,623 | 3.71 |

In Examples 2 to 4 according to an embodiment of the present invention, it can be observed that they meet the color difference criteria, phosphorus content, and tensile strength. In addition, when comparing Examples 2 to 4 with Comparative Example 1, which is a decorative sheet without the addition of polyphosphonate, it can be noted that a difference (dE*) in color difference value is 0.5 or less. Additionally, when compared to Comparative Example 1, Examples 2 to 4 satisfy the tensile strength ratio according to Equation 2, with a range of 0.7 to 1, despite the use of polyphosphonate as the fire retardant agent, showing very minimal differences in color difference specifications and tensile strength compared to the decorative sheet without polyphosphonate.

$$\text{Tensile strength ratio} = \text{(Tensile strength of flame-retardant polyester decorative sheet)/(Tensile strength of decorative sheet with no polyphosphonate added)} \quad \text{(Equation 2)}$$

In contrast, Comparative Example 4, with equal color master batch content in the skin layer and the core layer, exhibits a difference (dE*) in color difference value exceeding 0.5, indicating discoloration.

Comparative Example 5 with excessive polyphosphonate shows insufficient tensile strength, and Comparative Example 6 with a lack of polyphosphonate shows insufficient phosphorus content, resulting in reduced flame-retardant performance.

Excessive color master batch content in Comparative Example 7 leads to issues with insufficient tensile strength and unnecessary cost increases, while a lack of color master batch in Comparative Example 8 presents a problem with a difference (dE*) in color difference value exceeding 0.5.

Thus, the flame-retardant polyester decorative sheet according to an embodiment of the present invention has a laminated structure of the skin layer and the core layer, both using polyphosphonate fire retardant agent, providing a decorative sheet with flame-retardant performance, and satisfying the Flame Retardant Performance Standards of Notification No. 2019-2 of the National Fire Agency. Additionally, the flame-retardant polyester decorative sheet according to an embodiment of the present invention uses different content of a color master batch in the skin layer and the core layer to prevent discoloration, in an effort to maintain a color tone deviation similar to products that do not use fire retardant agent, as indicated by the aforementioned difference (dE*) in color difference value.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A flame-retardant polyester decorative sheet comprising:
   a core layer containing a first polyester resin and a first polyphosphonate; and
   a skin layer, which is positioned on at least one surface of the core layer and contains a second polyester resin and a second polyphosphonate,
   wherein contents of the first polyphosphonate and the second polyphosphonate satisfy Equation 1, respectively:

$$2.56 \leq \text{Total decorative sheet thickness (mm)} \times \text{polyphosphonate content } (wt.\%) \leq 2.58 \quad \text{(Equation 1)}$$

wherein the core layer contains 4 to 12 wt. % of a first color master batch based on the total weight of the core layer and the skin layer contains 25 to 35 wt. % of a second color master batch based on the total weight of the skin layer, and
   wherein a thickness of the flame-retardant polyester decorative sheet is 0.20 to 0.60 mm.

2. The flame-retardant polyester decorative sheet of claim 1, further comprising a protective coating layer containing a phosphorus-based fire retardant agent located on a surface of the skin layer.

3. The flame-retardant polyester decorative sheet of claim 1, wherein a phosphorus (P) content in the flame-retardant polyester decorative sheet is 4,000 to 15,000 ppm.

4. The flame-retardant polyester decorative sheet of claim 1, wherein a difference (dE*) in color difference value of the flame-retardant polyester decorative sheet is 0.5 or less compared to a decorative sheet with no polyphosphonate added.

5. The flame-retardant polyester decorative sheet of claim 1, wherein a tensile strength ratio of the flame-retardant polyester decorative sheet according to Equation 2 is 0.7 to 1:

$$\text{Tensile strength ratio} = \text{(Tensile strength of flame-retardant polyester decorative sheet)/(Tensile strength of decorative sheet with no polyphosphonate added)}. \quad \text{(Equation 2)}$$

6. The flame-retardant polyester decorative sheet of claim 1, wherein the first color master batch and the second color master batch are formed by mixing 10 to 50 parts by weight of color dye or pigment with 100 parts by weight of polyester resin, respectively.

* * * * *

UNITED STATES PATENT AND TRADEMARK OFFICE
CERTIFICATE OF CORRECTION

PATENT NO. : 12,134,251 B2
APPLICATION NO. : 18/567520
DATED : November 5, 2024
INVENTOR(S) : Ho Jin Min et al.

It is certified that error appears in the above-identified patent and that said Letters Patent is hereby corrected as shown below:

In the Claims

Delete Column 14, Lines 2-25 (Claim 1, Lines 1-19) and insert the following in its place:
--1. A flame-retardant polyester decorative sheet comprising:
    a core layer containing a first polyester resin and a first polyphosphonate; and
    a skin layer, which is positioned on at least one surface of the core layer and contains a second polyester resin and a second polyphosphonate,
    wherein contents of the first polyphosphonate and the second polyphosphonate satisfy Equation 1, respectively:
  (Equation 1)
  $2.56 \leq$ Total decorative sheet thickness (mm) × content of the first polyphosphonate (wt.%) $\leq 2.58$,
  $2.56 \leq$ Total decorative sheet thickness (mm) × content of the second polyphosphonate (wt.%) $\leq 2.58$,
    wherein the core layer contains 4 to 12 wt.% of a first color master batch based on the total weight of the core layer and the skin layer contains 25 to 35 wt.% of a second color master batch based on the total weight of the skin layer, and
    wherein a thickness of the flame-retardant polyester decorative sheet is 0.20 to 0.60 mm.--

Signed and Sealed this
Sixteenth Day of September, 2025

Coke Morgan Stewart
*Acting Director of the United States Patent and Trademark Office*